March 27, 1934.          H. J. ZIMMERMAN          1,952,831
AUTOMOBILE SIGNAL LIGHT
Filed April 10, 1933
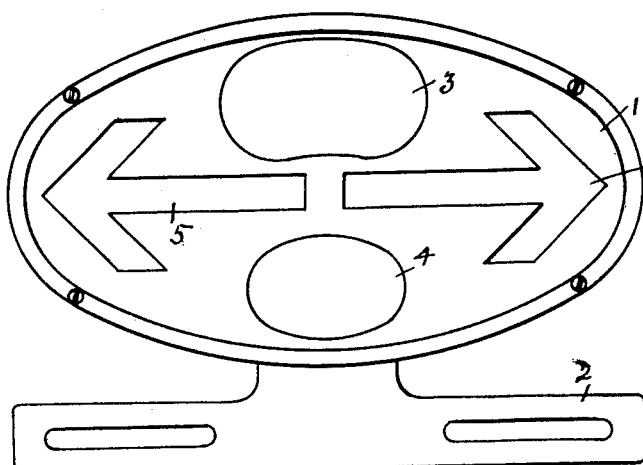
Fig. 1.
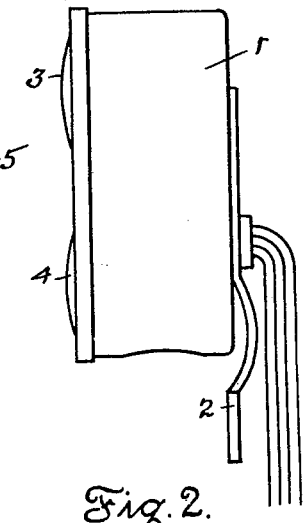
Fig. 2.
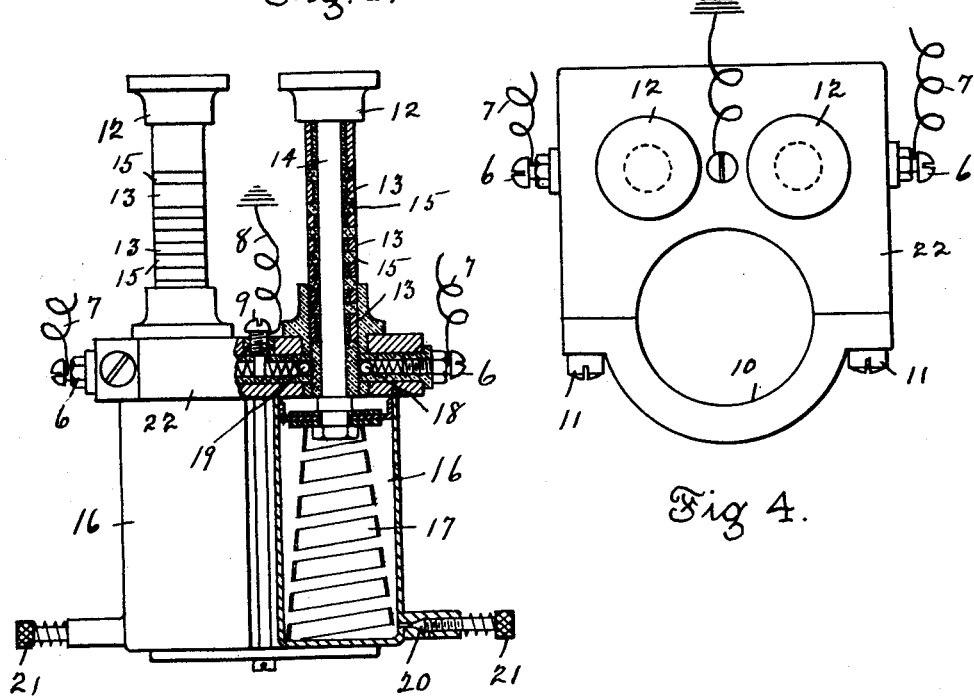
Fig. 3.                    Fig 4.
Inventor:
Henry J. Zimmerman
By Chapin & Ferguson
Attorney Patented Mar. 27, 1934

1,952,831

UNITED STATES PATENT OFFICE 1,952,831

AUTOMOBILE SIGNAL LIGHT

Henry J. Zimmerman, Baltimore, Md., assignor of one-third to Sophia F. Zimmerman, Baltimore, Md.

Application April 10, 1933, Serial No. 665,287

1 Claim. (Cl. 200—34)

This invention relates to an improved switch to be used in connection with direction indicating lights for motor vehicles, and has for its object to provide a simple and efficient device that can be conveniently located where it can be readily operated by the driver of the car to indicate in which direction he is going to turn.

The invention consists of the novel construction and arrangement of the parts and combination of parts hereinafter more fully set forth in the following specification and pointed out in detail in the appended claim.

In the accompanying drawing,—

Figure 1 is a rear view of a case divided into four compartments, the upper and lower compartment contain the stop light and tail light, respectively, and the two side compartments right and left lights.

Figure 2 is a side view of Figure 1.

Figure 3 is a detail view of the case that is attached to the steering column, and shows one of the cylinders and plungers in section.

Figure 4 is a top plan view of Figure 3.

Referring to the accompanying drawing, forming part of this specification, and in which like reference numerals designate like parts throughout the several views thereof, 1 designates the light case which is adapted to be attached to the rear of a motor vehicle and has a license plate frame 2 projecting below the case 1. The said case 1 is divided into four compartments each containing an electric bulb. The upper compartments 3 is for the stop light and the lower compartment for a tail light 4, both being operated in the usual manner. The two side compartments are each provided with an arrow 5, or other indicating means, one projecting to the right and the other to the left. The electric bulbs in the two compartments 5 are connected through the battery of the motor vehicle to the binding posts 6 by the wires 7. The wire 8 connected to the post 9 is grounded. The casing 22 is connected to the steering column of a motor vehicle by means of the clamp 10 which is held to the casing 1 by the screws 11. The plungers 12 are identical in construction and operation. One of said plungers operates the light back of the arrow pointing to the right and the other plunger operates the light back of the arrow pointing to the left. The plungers 12 are each provided with a number of metal rings 13 insulated from the plunger rod 14 and have rings of insulation 15 between the said metal rings 13. As the plungers 12 are forced down in the cylinders 16 against the action of the spring 17 the metal rings 13 come into contact with the metal balls 18 and 19 establishing a circuit to the bulb connected to that particular plunger and indicating in which direction the car is about to turn. As the plunger is forced down it causes a partial vacuum in the cylinder 16 which allows the plunger to move up slowly by the action of the spring 17 and as each metal ring 13 passes the balls 18 and 19 the light connected to that particular plunger flares off and on back of the arrow indicating the direction the car is turning or about to turn. The upward movement of the plunger 12 in the cylinder 16 is controlled by the amount of air admitted to the cylinder through the small ports 20 which is controlled by the valve 21.

It will thus be seen that when the driver is about to make a right or left turn he pushes on the right or left plunger 12 which causes the light back of the corresponding arrow to flash off and on as the plunger is forced down and as it is returning, thus indicating by the arrow in the case 1 in which direction the car is about to turn.

Having thus described my invention, what I claim is:

A switch comprising a casing having two separate chambers therein, a plunger in each of said chambers each having a number of contact rings thereon and spaced apart, a ring of insulating material between each of said metal rings, a spring in each of said chambers to hold the plungers in their normal raised position, a port in the bottom of each of said chambers, a valve in each of said ports to control the flow of air to said chambers to regulate the upward movement of said plungers, and a ball in the side of each of said chambers to co-operate with the contact rings as the plungers move up or down.

HENRY J. ZIMMERMAN.